United States Patent
Welch et al.

[11] Patent Number: 6,016,971
[45] Date of Patent: Jan. 25, 2000

[54] LAWN WATERING SYSTEM

[75] Inventors: Albert B. Welch, 3920 Centenary Dr., Dallas, Dallas County, Tex. 75225-5427; James R. Wood, Grapevine, Tex.

[73] Assignees: Albert B. Welch; Gloria Busey Welch, both of Dallas, Tex.; Trustees of Revocable Living Trust U/A/D December 13, 1995 by said Albert B. Welch

[21] Appl. No.: 08/799,893

[22] Filed: Feb. 13, 1997

Related U.S. Application Data

[60] Provisional application No. 60/011,802, Feb. 16, 1996.

[51] Int. Cl.[7] .................................................. A01G 25/00
[52] U.S. Cl. ............................................. 239/63; 137/68.3
[58] Field of Search ...................... 239/63, 69; 137/68.3; 327/205

[56] References Cited

U.S. PATENT DOCUMENTS

| | | |
|---|---|---|
| 2,768,028 | 10/1956 | Robinson ............................ 239/63 X |
| 2,946,512 | 7/1960 | Richards . |
| 2,969,185 | 1/1961 | Geiger . |
| 3,079,089 | 2/1963 | Tomayer . |
| 3,113,724 | 12/1963 | De Bough . |
| 3,195,816 | 7/1965 | Mercer . |
| 3,297,254 | 1/1967 | Coffman . |
| 3,488,000 | 1/1970 | Cramer . |
| 3,512,712 | 5/1970 | Benesch . |
| 3,642,204 | 2/1972 | McCloskey . |
| 3,750,950 | 8/1973 | Whitener . |
| 3,847,351 | 11/1974 | Hasenbeck . |
| 3,856,205 | 12/1974 | Rohling . |
| 3,874,590 | 4/1975 | Gibson . |
| 3,905,551 | 9/1975 | Chevreliere . |
| 3,991,939 | 11/1976 | Maclay . |
| 4,014,359 | 3/1977 | Sanner ................................ 239/63 X |
| 4,026,467 | 5/1977 | Chevreliere . |
| 4,194,691 | 3/1980 | Birnbach et al. . |
| 4,214,701 | 7/1980 | Beckman . |
| 4,253,606 | 3/1981 | Johnson . |
| 4,396,149 | 8/1983 | Hirsch . |
| 4,648,555 | 3/1987 | Gumbmann, Jr. . |
| 4,693,419 | 9/1987 | Weintraub et al. . |
| 4,971,248 | 11/1990 | Marino . |
| 5,100,056 | 3/1992 | Theodorsen et al. . |
| 5,208,855 | 5/1993 | Marian ................................ 239/69 X |
| 5,323,963 | 6/1994 | Ballu . |

FOREIGN PATENT DOCUMENTS

| | | | |
|---|---|---|---|
| 3702725 | 8/1988 | Germany .............................. 239/63 |
| 5-227851 | 9/1993 | Japan .................................... 239/63 |

*Primary Examiner*—Kevin Weldon
*Attorney, Agent, or Firm*—Sidley & Austin

[57] ABSTRACT

A system for automatically controlling a lawn watering system responsive to the moisture content of the soil includes at least one moisture sensor which supplies a signal to a moisture controller to actuate a water supply valve. The moisture sensor has a casing containing two electrodes and an insulating body of synthetic fibers which provide a path to transfer water from the soil to the electrodes.

17 Claims, 3 Drawing Sheets

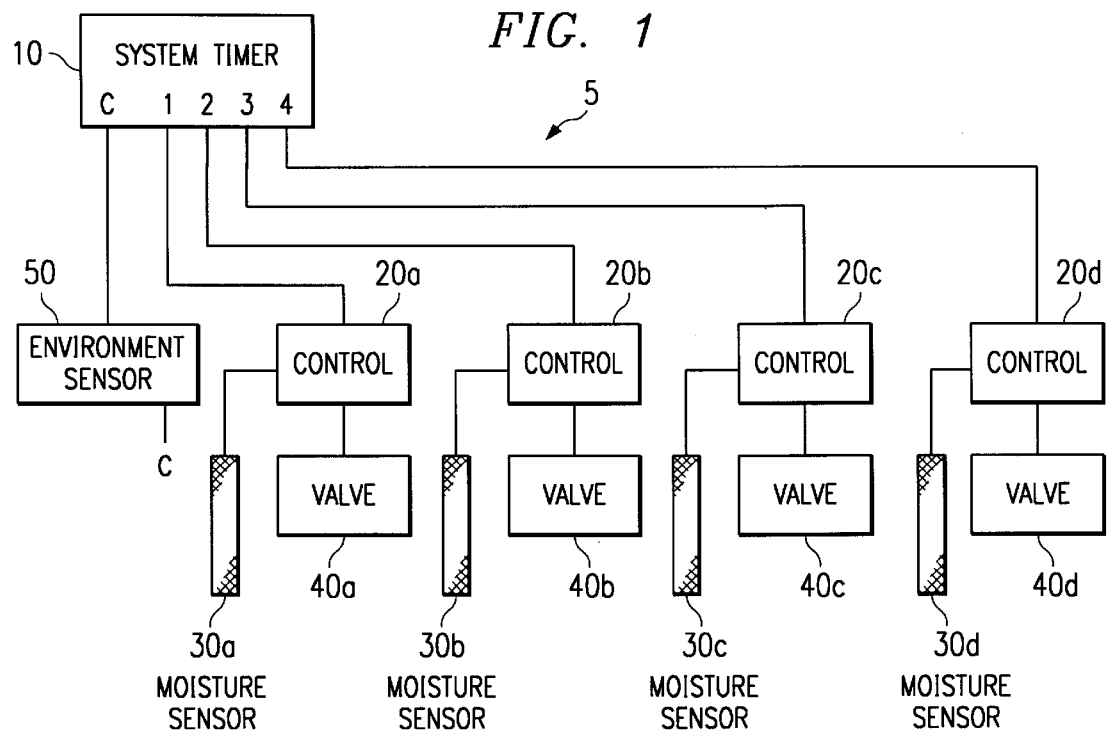
FIG. 1
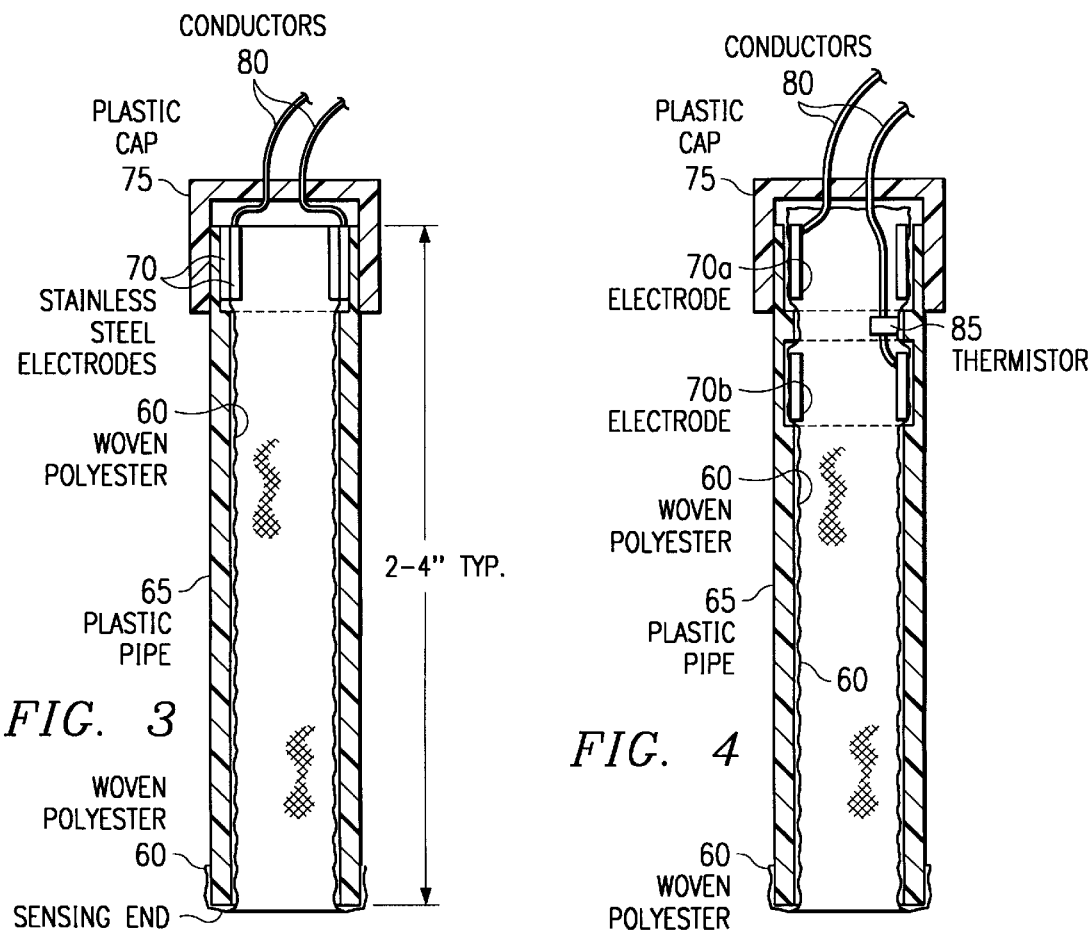
FIG. 3
FIG. 4

6,016,971

LAWN WATERING SYSTEM

This application claims the benefit of provisional application Ser. No. 60/011,802, filed Feb. 16, 1996.

FIELD OF THE INVENTION

This invention relates to a system for automatically controlling a watering system responsive to the moisture content of the soil.

BACKGROUND OF THE INVENTION

It has long been desired to provide a long lasting system that automatically waters an area of land when the soil reaches a predetermined moisture level. The agricultural industry has attempted to devise numerous systems to achieve such a result.

An example of a precursor to the automatic watering system of the present invention is the use of moisture sensors such as gypsum moisture blocks. The gypsum is cast around a pair of stainless steel electrodes and buried in the soil. Wire leads are attached to the electrodes and protrude outward from the soil and can be attached to a marker for reference. Then, a person can attach a resistance meter to the wires to obtain a resistance measurement. The resistance reading translates directly to soil moisture. There are many shortcomings associated with such a system. The most obvious drawback is that this is not an automatic system. It requires human intervention to take the readings and take action based upon those readings. The moisture sensors of the above described conventional system must also be replaced every season because the gypsum dissolves and exposes the electrodes thereby leading to corrosion. Furthermore, gypsum blocks do not work well with all types of crops. Instead, the gypsum blocks can accurately work only with crops that are less water-sensitive, such as cotton and small grains. Moreover, the above described system does not provide an accurate measure of soil moisture over an extended period of time. The calibration of the gypsum block changes with time, thereby limiting the life of the block.

Automatic watering systems have also been attempted, but suffer from some of the same drawbacks as the manual systems. Some automatic systems have moisture sensors which must be changed out each season and that do not give accurate readings over an extended period of time. Other systems require a user to position the sensors in series or parallel only, as opposed to either configuration. It is desired to have an automatic watering system that is as flexible as possible. It is further desirable to have a system that provides an accurate measure of soil moisture and that can be used for multiple seasons without requiring the sensors to be replaced.

Another drawback of some conventional automatic systems is the inadequacy of the moisture controller that controls a solenoid water valve. Conventional moisture controllers have problems such as producing significant radio frequency interference in nearby areas, thereby causing problems with neighboring houses. Some conventional moisture controllers also have problems with oscillation of the water valve due to a lowering of the supply voltage. For example, once the solenoid valve is actuated, a supply voltage drop occurs which can cause the control to then turn off the valve, causing oscillation. Other exemplary conventional moisture controllers do not operate at the same voltage as the water valves which they control; or the moisture controllers require more current than the overload protection of the valve. This prevents the moisture controller from being connected directly to the valve. It is desired to have a moisture controller that can prevent oscillation of the valve and that can be positioned and connected to the valve itself.

SUMMARY OF THE INVENTION

The system of the present invention is designed to be compatible with existing electrical lawn watering systems and features a unique moisture controller, which can be located at the valve, and a unique moisture sensor. The current system is capable of working with conventional timer devices and solenoid valves to provide an automatic watering system that is flexible, accurate and long lasting.

The watering system of the present invention comprises a solid state moisture controller that operates at the same voltage as the valve, and on less current than the overload protection of the valve provided by the timer. This allows the moisture controller to be located at the valve or to be incorporated into the timer. The moisture controller also provides an inductive load while maintaining zero-voltage-crossing for reduced radio frequency interference, and provides a hysteresis circuit to prevent oscillation when the valve is actuated.

Also included in the watering system of the present invention is a moisture sensor. The moisture sensor can be buried to where the sensing end of the sensor is at the level of the roots. For a lawn, this is about four inches below the soil surface. The moisture sensor is connected to the controller and can be designed to provide operation for multiple seasons. The sensor covers decades of range of ac resistance and therefore can be used in parallel or series depending on the needs of the user. The moisture sensor operates on low alternating voltage and very low current, with moisture being transported from the soil to the electrodes using capillary action. Furthermore, the moisture sensor of the present invention uses a synthetic material to line the sensor which does not degrade as quickly as organic material and protects the electrodes from contamination due to contact with the soil. These advantages give the moisture sensor of the present invention longer life. The moisture sensor can also provide temperature compensation to the watering system by including a temperature sensor with the moisture sensor.

An environment sensor can also be added to the automatic watering system of the present invention. For example, a freeze sensor can be added to the common leg of the timer to prevent the release of water when the temperature is near freezing.

An automatic lawn watering system is provided, comprising a system timer to selectively provide a timing control signal at predetermined times; a water valve capable of receiving a valve control signal and of permitting water to be dispensed to a predetermined area of soil in response to the valve control signal; at least one moisture sensor to be buried at least partially in the predetermined area of soil, comprising an insulating body, at least two electrodes connected to the body, and a synthetic material connected to the body and to the two electrodes, wherein the synthetic material contacts the soil while shielding the two electrodes from the soil and provides the moisture of the soil to the two electrodes and the moisture sensor is capable of providing a moisture control signal corresponding to the amount of moisture in the predetermined area of soil; and a moisture controller coupled to the system timer, at least one moisture sensor, and to the valve, wherein said moisture controller is capable of receiving the timing control signal from the system timer and a moisture control signal from the moisture sensor and of providing a valve control signal to the valve in response to the moisture controller signal, thereby facilitating the actuating of the valve.

A novel and advantageous moisture controller for use in an automatic watering system is provided, comprising a zero-crossing switch capable of receiving a voltage corresponding to an amount of moisture in a predetermined area of soil and of providing a valve control signal in response to the moisture control signal to thereby actuate a valve; an input circuit for receiving an ac voltage input and for providing a corresponding dc voltage to the zero-crossing switch; and a hysteresis circuit coupled to the zero-crossing switch and to the valve, wherein the hysteresis circuit prevents the oscillation of a valve in response to a drop in the supply voltage due to the actuation of the valve. The moisture controller operates at substantially the same voltage as the valve, and on less current than the overload protection provided to the valve.

A moisture sensor for use in an automatic watering system is provided for determining the amount of moisture in a predetermined area of soil by contact with the predetermined area of soil is provided, comprising a housing constructed of substantially tubular hollow insulating material having a terminal portion and a sensing portion, wherein the housing is substantially closed at the end of the terminal portion, the housing further having an inner surface and an outer surface; a plurality of electrodes fixed to the inner surface of the terminal portion of the housing to thereby provide electrical contacts to measure the resistance of the predetermined area of soil; and a synthetic material in contact with the soil is attached to the housing and lining at least a portion of the inner surface of the housing and coupled to the plurality of electrodes to thereby provide moisture from the soil to the plurality of electrodes using capillary action.

BRIEF DESCRIPTION OF THE DRAWINGS

FIG. 1 is a diagram of a lawn watering system;

FIG. 3 is a vertical cross-sectional view of a moisture sensor in accordance with a first embodiment of the present invention;

FIG. 4 is a vertical cross-sectional view of a moisture sensor in accordance with a second embodiment of the present invention;

DETAILED DESCRIPTION

Figure 2:
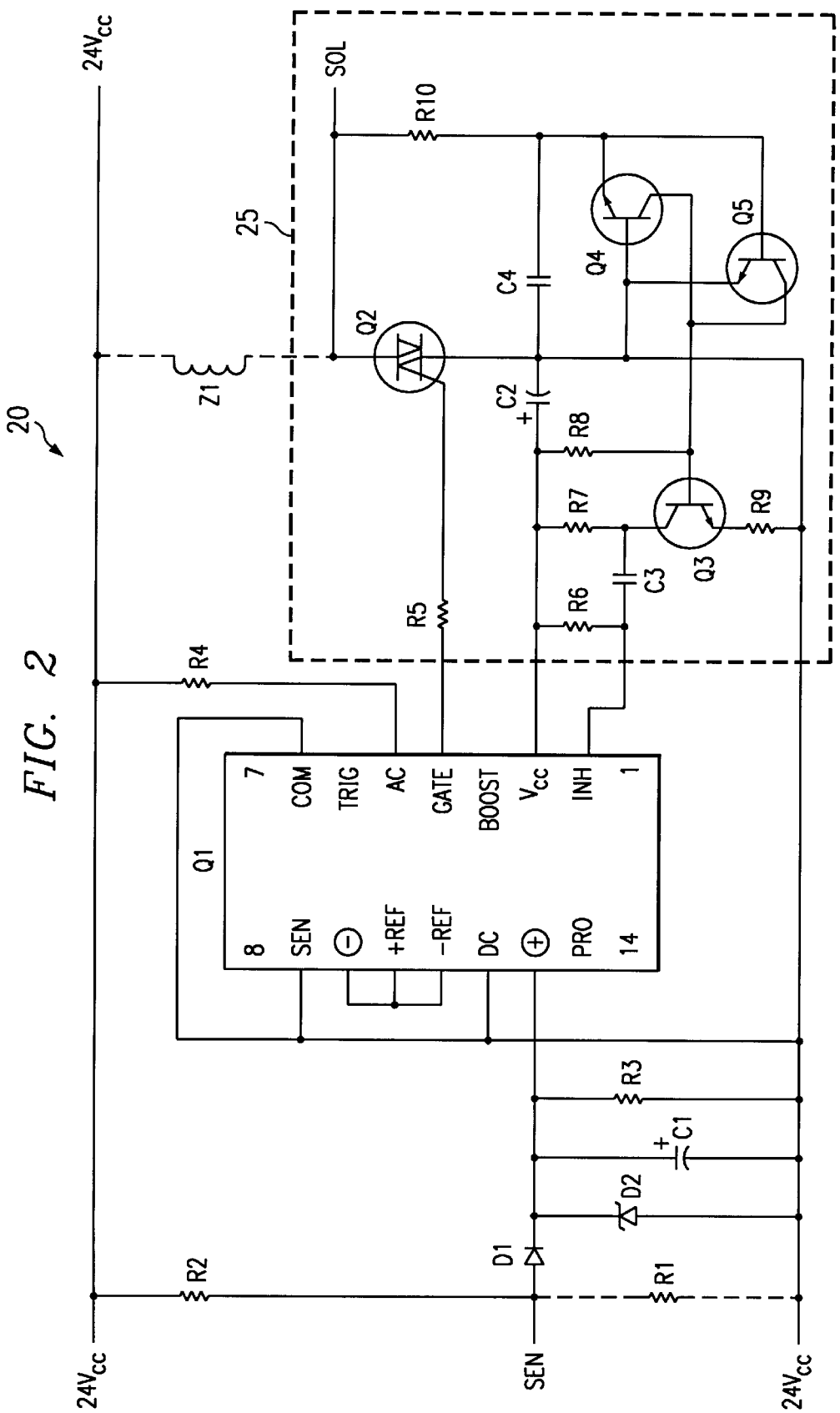
FIG. 2 is a schematic of an electric circuit which is employed as a moisture controller in the system of FIG. 1.

The watering system of the present invention is more distinctly described below with reference to the figures. Referring to FIG. 1, a diagram of an automatic watering system 5 is illustrated.

System timers for use in an automatic watering system are well known in the art. An exemplary system timer used by the present invention is the Lawn Genie Model L40104. System timer 10 is shown as having four terminals connected to four different moisture controllers 20a–20d. A person of ordinary skill in the art would understand that a system timer 10 may be used with a larger or smaller number of moisture controllers. System timer 10 also has a common leg (pin C) which can be used with an environment sensor 50. System timer 10 provides power to its attached moisture controllers 20a–20d at predetermined times.

An environment sensor 50 is coupled to the common input of the system timer 10. The common input is connected in series with the entire watering system 5. Therefore, when the environment sensor 50 provides a control signal to the system timer 10, the entire watering system 5 is shut down, even if the timer 10 is "on." For example, environment sensor 50 is typically a freeze sensor that detects when the temperature is at or near freezing and, if so, the environment sensor 50 can provide a freeze control signal to the system timer 10 which will disable the watering system 5 altogether, preventing watering and severe damage to the crop or grass. The environment sensor 50 can be a freeze sensor or any sensor that opens when it is desired to disconnect the entire system. Environment sensor 50 is not required for the normal operation of the present invention, but instead offers another option for the user.

The moisture sensors 30a–30d, can be set at different depths in the soil and with different sensitivities to the moisture in the soil. The moisture sensors 30a–30d contact the soil, detect its moisture, and provide a control signal (usually an ac resistance), corresponding to the amount of moisture in the soil, to their respective moisture controller 20a–20d. The moisture sensors 30a–30d are described in greater detail below with reference to FIGS. 3–5.

The moisture controllers 20a–20d are coupled to the moisture sensors 30a–30d respectively, and also to valves 40a–40d respectively. Each moisture controller 20 is further connected to the system timer 10 (shown at pins 1–4) in parallel. Upon receiving a moisture control signal (indicating that the soil is at a predetermined level of moisture) from one of the moisture sensors 30a–30d, the corresponding moisture controller 20a–20d provides a valve control signal to its normally closed valve 40a–40d to thereby open it. The opening of the corresponding valve 40a–40d causes water to be dispensed to a predetermined area. The moisture controllers 20a–20d are shown in greater detail below with reference to FIG. 2.

Solenoid valves 40a–40d are well known in the art and are connected to a water dispensing apparatus (not shown) such as a sprinkler or water line. In the preferred embodiment, valve 40 is a normally closed solenoid valve with Z1 representing an inductive load as described in FIG. 2.

Still referring to FIG. 1, the watering system 5 of the present invention provides water to a predetermined area of soil based on a detection of the moisture content of that soil. Because the system is set up in parallel, any one of the sensors can cause the system 5 to water a predetermined area. The operation of the watering system 5 will be described with reference to only one moisture sensor 30, and its corresponding moisture controller 20 and valve 40. The moisture sensor 30 is buried at least partially such that a portion of the sensor comes in contact with the soil. The moisture sensors 30 provides an ac resistance value to the moisture controller 20, this ac resistance corresponds to the moisture in the soil around sensor 30. At a predetermined ac resistance of moisture sensor 30, the moisture controller 20 provides a control signal to its valve 40 to thereby open that valve 40 and cause the soil to be watered.

Referring now to FIG. 2, a detailed schematic of the moisture controller 20 is illustrated. The moisture controller 20 has a number of advantageous features. For example, moisture controller 20 can operate at the same voltage as the valve 40, and on less current than the overload protection of the valve 40 provided by the system timer 10. This permits the controller 20 to be located at the valve 40 or to be integrated with the system timer 10. The moisture controller 20 also provides zero-voltage-crossing switching of the load current to prevent excessive radio frequency interference. Furthermore, moisture controller 20 provides hysteresis such that lowering of the supply voltage due to actuation of the valve 40 does not cause the moisture controller 20 to turn off the valve 40 and thereby cause oscillation. Additionally, moisture controller 20 provides low voltage, low alternating current (ac) to the moisture sensor to inhibit polarization.

The circuit of FIG. 2 provides the moisture controller 20 as it is used in a preferred embodiment with a Lawn Genie Model L40104 or equivalent system timer 10 (not shown). This circuit draws about 8% (~20 milliamperes) of the current drawn by a Lawn Genie Model L6034 valve under steady state conditions (~250 milliamperes). The approximate values of the components of a preferred embodiment of the moisture controller 20 are listed in Table 1.

TABLE 1

| COMPONENT | APPROXIMATE VALUE/TYPE |
|---|---|
| R1 | 14K ohms (SENSOR) |
| R2, R6 | 100K ohms |
| R3 | 1M ohms |
| R4 | 2.2K ohms (½ WATT) |
| R5 | 68K ohms |
| R7 | 6.8K ohms |
| R8 | 220K ohms |
| R9 | 10K ohms |
| R10 | 3.3K ohms |
| C1 | 10 μf |
| C2 | 220 μf |
| C3 | 0.01 μf |
| C4 | 0.022 μf |
| D1 | Si Diode |
| D2 | 5.6 V Zener Diode |
| Q1 | CA3059 (Zero-Voltage-Crossing Switch) |
| Q2 | T2800B (Triac) |
| Q3, Q4, Q5 | MPS2222A (NPN Transistor) |

An input circuit is provided which comprises a rectifying diode D1, a zener diode D2, a dc filtering capacitor C1, and a biasing resistor R3. This input circuit converts the ac input into a dc voltage for use with the remainder of the moisture controller circuit 20 and is connected to the sensor input (pin 13) of the zero-voltage-crossing switch Q1. The drop across the rectifying diode D1 is about 0.7 volts, yielding 2.8 volts direct current from 2.5 volts alternating current when the supply is 24 volts ac. The 24 volts ac supply is provided from the system timer (not shown). The direct current is filtered by capacitor C1 and limited by the zener diode D2 to less than 5.6 volts dc to prevent it from exceeding the supply dc voltage at the zero-voltage-crossing switch Q1.

A bridge which includes the moisture sensor(s), and can include a temperature sensor(s) in series with the moisture sensor(s), is represented by the dashed lines and labeled R1. The bridge operates at a bridge point of less than 3 volts ac at 250 microamperes or less, which is low enough to inhibit polarization while the timer is "on". The sensitivity of the moisture sensor can be decreased by increasing the value of resistor R2, thereby increasing the value of resistance at which the sensor triggers the solenoid Z1 which operates the valve (not shown). The power is applied periodically in accordance with the setting of the timer.

An output circuit 25 is provided to open the normally closed solenoid valve (represented by the dashed lines and inductor Z1). A triac switch Q2 is coupled to the gate output of the zero-voltage-crossing switch Q1 in series with resistor R5. The triac switch Q2 is also coupled to the solenoid valve at the output node (labeled Sol.). Triac Q2 is further connected to the paralleled base-emitter combination of transistors Q4 and Q5. If the moisture sensor is dry, positive pulses are output of the gate pin of zero-voltage-crossing switch Q1 and are passed through the resistor R5 to the gate of the triac Q2 to turn on the solenoid valve. The resistor R5 limits the current to the triac gate Q2. These pulses can be about 200 microseconds in duration and occur at the zero-voltage-crossing of the load Z1. The capacitor C4 is added to shift the phase of the pulses slightly and avoid oscillation in the triggering of the triac Q2.

The drop across the triac Q2 is ~0.7 volt. The inductive load of the valve Z1 presents an impedance of approximately 100 ohms at a current lag angle of ~54 degrees after the initial surge has passed. The valve voltage is taken as the drop to the triac and is applied to the paralleled base and emitter terminals of the transistors Q4 and Q5. When the voltage across this pair of transistors is less than 0.7 volt, resistor R8 pulls the collector voltage of Q4 positive. This voltage is inverted by the transistor Q3, and applied through the capacitor C3 to the inhibit terminal of the zero-voltage-crossing switch Q1 as a negative-going pulse.

A hysteresis circuit is provided by loading down the resistor R4 when the average current into the triac gate is ~1.5 milliamperes as controlled by the resistor R5. In the circuit shown in FIG. 2, this results in about 0.3 volt drop in the reference (pin 9) versus about 0.2 volt in the sensor input (pin 13). Thus the "on" signal to the triac Q2 is always greater than the "off" signal to the triac Q2 and oscillation of the valve is avoided.

It is appreciated by one of ordinary skill in the art that alternatives to the output circuit 25 exist without departing from the scope of the present invention. For example, although the current is higher, one could drive the protect circuit (pin 14) of Q1 with positive pulses from an emitter follower circuit, rather than the inhibit circuit with negative pulses. The emitter resistor can be in the order of 2.2K ohms or lower, making the current drawn by this circuit 35 milliamperes or greater. The transistors Q3, Q4 and Q5 can be replaced with an array such as CA3086 while other functions of the circuit remain the same.

Turning now to FIG. 3, a vertical cross-sectional view of a moisture sensor 30 is illustrated. In its simplest form, the moisture sensor 30 is comprised of polyester fabric 60, or some other synthetic fiber, about 0.010" thick running the length of a ½" internal diameter insulating tube 65 of about 2" to 4" in length. This synthetic fabric 60 serves as a filter between the soil (not shown) and at least two electrodes 70. Electrodes 70 are located on the inner surface of the cap 75 and are preferably comprised of stainless steel. Electrodes 70 do not cover the entire circumference of the inner surface of the cap 75. Instead, electrodes 70 oppose each other within the inner surface of the cap 75 leaving some space in between. The upper 0.5" of the synthetic fabric 60 is between stainless the steel electrodes 70 and the soil, and the lower portion of the fabric 60 is folded over the lower end of the tube 65 a short distance to ensure contact with the moisture in the surrounding soil.

The tube 65 is covered on the end of the top or terminal portion of the tube 65. In one embodiment a plastic cap 75 covers the end of the terminal portion. The cap 75 can be attached to the tube in any number of ways. By way of example and not limitation, the plastic cap 75 can be glued on to the tube 65, it can be internally threaded to mate with an externally threaded terminal portion, or the cap 75 can be a molded part of the tube 65.

Conducting wires 80 are coupled to the electrodes 70 to provide an electrical connection to the electrodes that extends outside of the sensor 30 and the soil to thereby connect with other parts of the watering system. The number of conducting wires 80 is equal to the number of electrodes 70.

The ac resistance between the electrodes 70 is about two kilohms when the soil is wet and several megohms when the soil is dry, giving a change in ac resistance of more than three orders-of-magnitude from wet to dry soil. Thus, the moisture sensors 30 can be arranged in the watering system with two or more in series or parallel.

Figure 6:
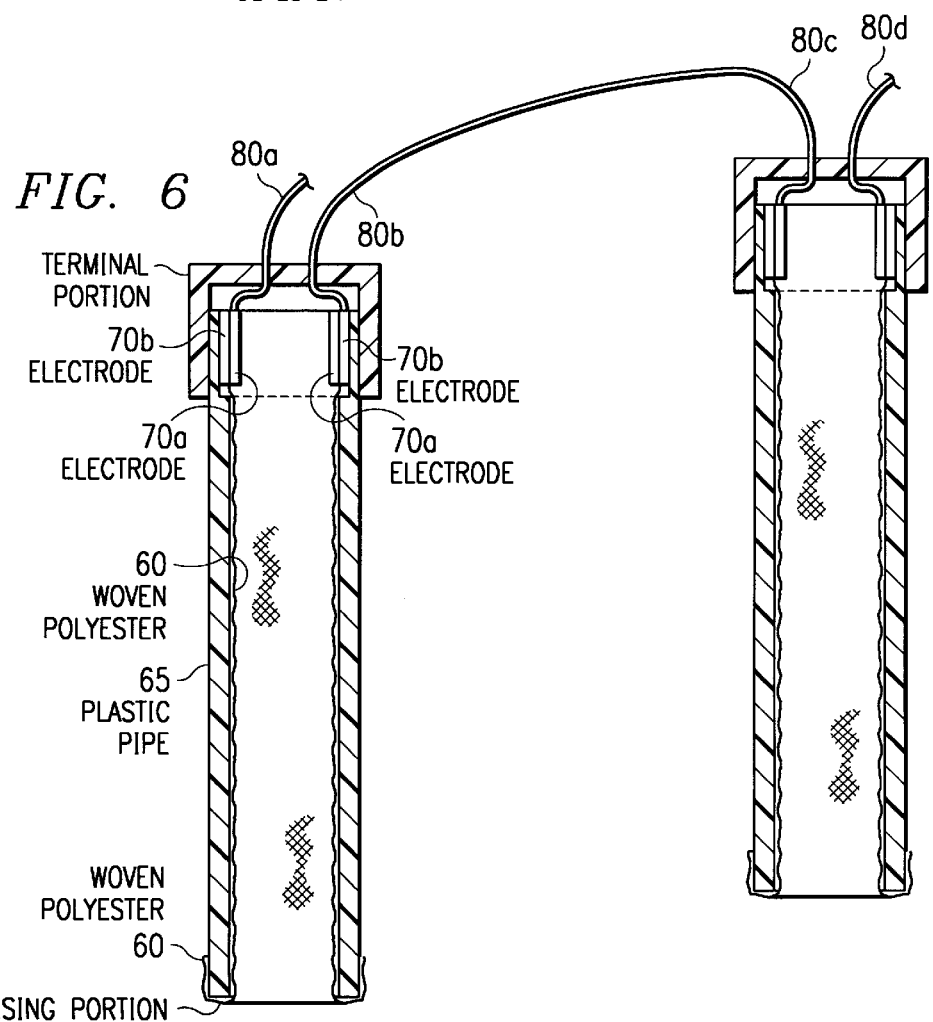
FIG. 6 is a vertical cross-sectional view of a plurality of moisture sensors coupled in series.

In the series arrangement shown in FIG. 6, multiple sensors 30 are connected in series to one moisture controller 20 (not shown). Conductor 80*b* is connected to conductor 80*c* while conductors 80*a* and 80*d* are connected to moisture controller 20. For example, with one sensor 30 below and another above, the sensor 30 which dries out first controls by raising the ac resistance sensed by the moisture controller 20 and turning on the valve 40 (not shown). When the sensors 30 are arranged in parallel with multiple sensors 30 connected in parallel to one moisture controller 20, all sensors 30 must be of high resistance to trigger the moisture controller 20 to open the valve 40.

The moisture sensor 30 is not just an electrical equivalent of a mechanical moisture sensor. Unlike wood or polyurethane gel swelling sensors, its electrical conductance (the inverse of resistivity) depends on the periphery of metal in contact and the field concentrations between the electrolyte in the fabric 60 (water containing minerals) and the electrodes 70*a* and 70*b*. It is independent of pressure, area and thickness.

The conductance is dependent on the radius of the edge of the plate or wire forming the electrode 70 and the length of contact with the electrolyte, provided that the effects of field concentrations are taken into account. For example, the effect of one electrode 70*a* spaced ¼" from a similar electrode 70*b* is ~20 micromhos per inch (wet) whereas placing two similar electrodes 70*a* and 70*b* spaced ¼" on either side of a central main electrode 70*c* (shown in FIG. 5) is 1.8 times the conductance or ~36 micromhos per inch. Spacing the similar electrodes ¼" and ½" away from the same side of the main electrode is only 1.05 times the conductance, or ~21 micromhos per inch. The conductance would have doubled for electrodes on either side of the main electrode or remained the same for electrodes added to the same side were it not for the effects of field concentrations.

Referring now to FIG. 4, an alternative embodiment of the moisture sensor 30 is illustrated in vertical cross-section. In this embodiment the ac resistance of the moisture sensor(s) 30 can be increased by arranging the pairs of electrodes 70*a* and 70*b* in series, where the conductance path is axial through the length of the polyester fabric 60 rather than through the thickness. With a pair of ½ inch wide electrodes 70*a* and 70*b*, spaced about ⅛ inch apart, the ac electrical resistance is increased for moist fibers from about 2 kilohms to about 10 kilohms. As described above, this does not agree with the conventional definition of bulk resistivity which, if the moist fibers were treated as having some bulk resistivity, would yield two orders-of-magnitude difference in resistance.

The sensor can also be compensated for temperature by and placing a thermistor 85, such as the Radio Shack thermistor 271-110, between the electrodes 70*a* and 70*b*.

The thermistor 85 varies from 27,300 to 5,800 ohms as the temperature varies from 0 to 40° Centigrade (32 to 104° Fahrenheit). The resistance of the wet sensor 30 with ⅛ inch spacing varies from 6,300 to 1,800 ohms over the same range in the same direction. With 60,000 ohms (60K) in parallel with the thermistor 85, the range is 18,800 to 5,400 ohms or about 3 times the sensor 30 wet resistance, in the same direction. Thus with reference to FIG. 2, with one end of the thermistor 85 (in parallel with 60K) at the common pin of Q1 (pin 7) and the other end of the thermistor 85 at the minus pin of Q1 (pin 9), with the jumper removed from the –Ref pin (pin 11), the internal 10K from $V_{cc}$ to +Ref (pin 2 to pin 10) presents the same voltage difference to the comparator or bridge (pin 9 to pin 13) regardless of temperature.

Alternatively, if the thermistor 85 is of reverse sense to the Radio Shack thermistor, it could be added in series with the moisture sensor 30. Thus if the temperature goes up, the resistance of the moisture sensor 30 goes down and the device resistance goes up, yielding a constant total resistance versus temperature. A decrease in moisture yields a total increase in resistance and thus the thermistor 85 and moisture sensor 30 in series can be substituted for the moisture sensor alone (R1) in FIG. 2.

In one embodiment, two or more moisture sensors would be used in the vertical arrangement with only the top sensor, nearest the earth surface, including a temperature sensing device. This is because only the top layer of soil normally changes temperature diurnally with the atmosphere. In some cases the deeper layers of soil would require temperature compensation and would also require thermistors. Where this is the case, and two or more moisture sensors are connected in series so the first to dry controls, the thermistors could also be connected in series. This is true whether the temperature sensors are of the same sense as the moisture sensors, and so connected on the opposite side of the bridge, or of the opposite sense and so are necessarily in series with the moisture sensor.

Figure 5:
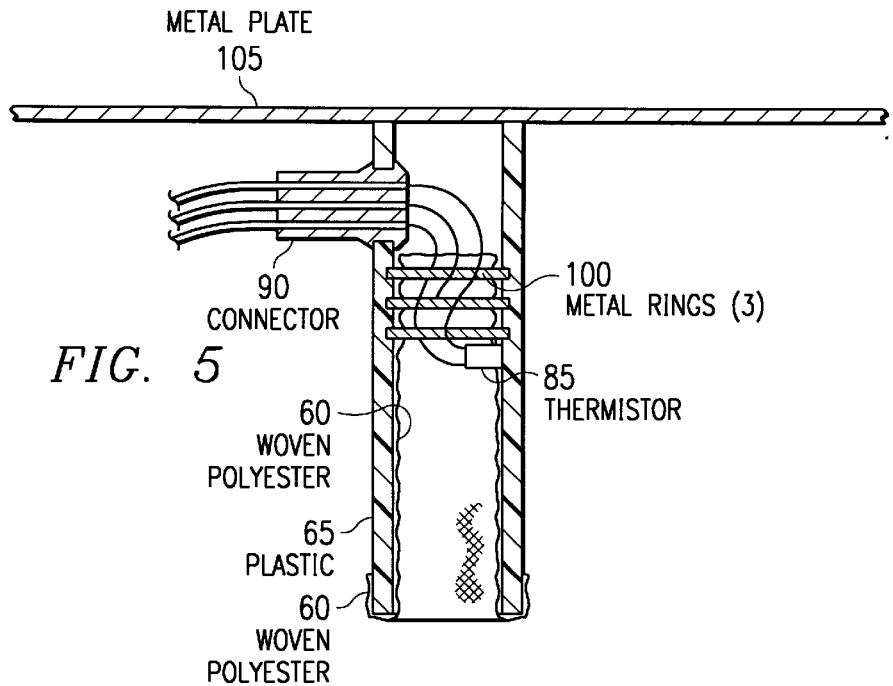
FIG. 5 is a vertical cross-sectional view of a moisture sensor in accordance with a third embodiment of the present invention.

FIG. 5 shows another embodiment of a moisture sensor 30. Shown in section is the addition of a waterproof connector 90, metal rings 100 for electrodes, and the thermistor 85 temperature sensor. The connector 90, ring electrodes 100 and thermistor 85 could of course be used in any combination with the sensor of FIG. 4. In addition, FIG. 5 shows a metal plate 105 whose main function is to allow a user to locate the moisture sensor 30 in case a replacement is needed. The plate 105 is situated, generally on top of the top-most moisture sensor 30, so as to produce an audible or meter alarm when the sensing coil of an ordinary metal locator is passed nearby. An alternative is the use of a radioactive isotope, in lieu of the plate 105, and a passive locator based on radioactive emission of the emitting element in close proximity to the moisture sensor.

It is intended that reasonable variations and modifications to the invention are possible within the scope of the foregoing description and drawings, and the appended claims.

What is claimed:

1. An automatic lawn watering system comprising:
   a valve capable of receiving a valve control signal and of permitting water to be dispensed to a predetermined area of soil in response to said valve control signal;
   at least one moisture sensor to be at least partially buried in said predetermined area of soil, said at least one moisture sensor comprising an insulating body, at least two electrodes connected to said insulating body, and a synthetic material connected to said at least two electrodes, wherein said synthetic material contacts said predetermined area of soil while shielding said at least two electrodes from said predetermined area of soil and provides moisture from said predetermined area of soil to said at least two electrodes through capillary action, and wherein said moisture sensor is capable of providing a moisture control signal corresponding to an amount of moisture in said predetermined area of soil; and a moisture controller coupled to said at least one moisture sensor and to said valve, wherein said moisture controller is capable of receiving said moisture control signal from said at least one moisture sensor and of providing said valve control signal to said valve in response to said moisture control signal.

2. An automatic lawn watering system in accordance with claim 1 wherein said valve and said moisture controller operate at substantially equal voltages, and wherein said moisture controller operates at a current that is less than an overload current protection provided to said valve.

3. An automatic lawn watering system in accordance with claim 1 further comprising a system timer coupled to said moisture controller, wherein said system timer is capable of selectively providing a timing control signal to said moisture controller at predetermined times.

4. An automatic lawn watering system in accordance with claim 3 further comprising an environment sensor coupled to said system timer, said environment sensor being capable of providing an environment control signal to said system timer, wherein said environment control signal can prevent the dispensing of water to said predetermined area of soil.

5. An automatic lawn watering system in accordance with claim 1 wherein said synthetic material comprises polyester fibers.

6. An automatic lawn watering system in accordance with claim 5 wherein a plurality of moisture sensors are coupled in series and connected to said moisture controller.

7. A moisture controller for use in an automatic watering system comprising:

a zero-crossing switch capable of receiving a dc voltage corresponding to an amount of moisture in a predetermined area of soil and of providing an output control signal to an output load in response to said dc voltage;

an input circuit for receiving an ac voltage input and for providing said dc voltage to said zero-crossing switch, wherein said dc voltage corresponds to said ac voltage; and a hysteresis circuit coupled to said zero-crossing switch, wherein said hysteresis circuit prevents an oscillation of said output load in response to a drop in said dc voltage supplied to said zero-crossing switch due to an actuation of said output load.

8. A moisture controller in accordance with claim 7 wherein said output load is a solenoid actuated valve.

9. A moisture controller in accordance with claim 7 wherein said moisture controller is located at said valve; said moisture controller and said valve operate at substantially equal voltages, and wherein said moisture controller operates at a current that is less than an overload current protection provided to said valve.

10. A moisture controller in accordance with claim 7 wherein said moisture controller is coupled to a moisture sensor, and wherein said input circuit of said moisture controller inhibits polarization of said moisture sensor.

11. A moisture sensor for determining an amount of moisture in a predetermined area of soil by contact with said predetermined area of soil comprising:

a housing constructed of substantially tubular hollow insulating material having a terminal portion and a sensing portion, wherein said housing is at least substantially closed at an end of said terminal portion, said housing further having an inner surface and an outer surface;

a plurality of electrodes fixed to said inner surface of said terminal portion of said housing to thereby provide electrical contacts to measure the resistance of said predetermined area of soil; and a synthetic material attached to said housing and lining at least a portion of said inner surface of said housing, said synthetic material coupled to said plurality of electrodes to thereby contact said predetermined area of soil and provide moisture from said predetermined area of soil to said plurality of electrodes through capillary action.

12. A moisture sensor in accordance with claim 11 wherein said synthetic material comprises polyester.

13. A moisture sensor in accordance with claim 11 wherein said plurality of electrodes comprise stainless steel.

14. A moisture sensor in accordance with claim 13 wherein said plurality of electrodes are arranged in series such that a conductance path between said electrodes is axial through a length of said synthetic material.

15. A moisture sensor in accordance with claim 13 wherein said synthetic material extends outside an end of said sensing portion of said housing.

16. A moisture sensor in accordance with claim 13 wherein said moisture sensor further comprises a temperature sensor coupled to said plurality of electrodes such that said temperature sensor is capable of providing a signal to said plurality of electrodes which corresponds to a temperature of said predetermined area of soil.

17. A moisture sensor in accordance with claim 13 wherein said plurality of electrodes comprise three rings spaced vertically apart from each other within said inner surface of said housing and where said three rings are positioned substantially parallel to a substantially circular cross-section of said housing.

* * * * *